(12) United States Patent
Bray et al.

(10) Patent No.: US 12,005,620 B2
(45) Date of Patent: Jun. 11, 2024

(54) INJECTION MOULDING METHOD AND SYSTEM FOR FORMING AN OVEN LINER AS WELL AS OVEN LINER

(71) Applicant: REGALE MICROWAVE OVENS LIMITED, Gosport (GB)

(72) Inventors: Patrick Bray, Gosport (GB); Mark Thompson, Newhaven (GB)

(*) Notice: Subject to any disclaimer, the term of this patent is extended or adjusted under 35 U.S.C. 154(b) by 554 days.

(21) Appl. No.: 17/059,880

(22) PCT Filed: Jun. 5, 2019

(86) PCT No.: PCT/IB2019/054681
§ 371 (c)(1),
(2) Date: Nov. 30, 2020

(87) PCT Pub. No.: WO2019/234656
PCT Pub. Date: Dec. 21, 2019

(65) Prior Publication Data
US 2021/0260799 A1    Aug. 26, 2021

(30) Foreign Application Priority Data

Jun. 5, 2018    (GB) ..................................... 1809231
Sep. 24, 2018   (GB) ..................................... 1815555

(51) Int. Cl.
*B29C 45/44*    (2006.01)
*A47J 36/02*    (2006.01)
(Continued)

(52) U.S. Cl.
CPC ......... *B29C 45/4435* (2013.01); *A47J 36/027* (2013.01); *A47J 36/04* (2013.01);
(Continued)

(58) Field of Classification Search
CPC ............................ B29C 45/44; B29C 45/4435
See application file for complete search history.

(56) References Cited

U.S. PATENT DOCUMENTS 4,209,161 A * 6/1980 Horvath ................. B22D 17/24
249/180
4,481,395 A * 11/1984 Smith .................... H05B 6/808
219/735
(Continued)

FOREIGN PATENT DOCUMENTS

DE    102011011784 A1    8/2012
EP        1547446 P       6/2005
(Continued)

OTHER PUBLICATIONS

Combined Search and Examination Report under Sections 17 and 18(3) for United Kingdom Patent Application No. GB1815555.6 dated Mar. 12, 2019 (6 pages).
(Continued)

*Primary Examiner* — Cachet I Proctor
(74) *Attorney, Agent, or Firm* — Withrow & Terranova, P.L.L.C.; Vincent K. Gustafson

(57) ABSTRACT

The present invention relates to an injection moulding system for forming an oven liner, particularly of the type that is used with microwave ovens. Oven liners are of particular benefit when used inside microwave ovens. They improve hygiene as where food spills or spurts onto the oven liner rather than an interior of the microwave oven. An injection moulding system for forming an oven liner includes: a first mould tool which defines a cavity of length (L), width (W) and height (H), the first mould tool has a substantially rectangular end face with dimensions corresponding to the width (W) and height (H) of the cavity and has a hot feed located at a centroid of its end face; and a wedge collapsing tool is received in the cavity so as to contact and engage with an external periphery of the first mould tool at selected locations in order to define a volume into which hot material feed is injected, wherein the wedge collapsing tool comprises a first part and a second part in slidable contact one
(Continued)

with another, and the width (W2) of the second part exceeds the width (W1) of the first part of the wedge collapsing tool by at least 0.1 mm so that a split line is formed on at least one side of an interior surface of the oven liner.

20 Claims, 10 Drawing Sheets

(51) Int. Cl.
    *A47J 36/04*     (2006.01)
    *B29C 45/33*     (2006.01)
    *F24C 15/08*     (2006.01)
    *H05B 6/64*     (2006.01)
    *B29L 31/00*     (2006.01)

(52) U.S. Cl.
    CPC .............. *B29C 45/33* (2013.01); *F24C 15/08* (2013.01); *H05B 6/6402* (2013.01); *B29L 2031/762* (2013.01)

(56) References Cited

U.S. PATENT DOCUMENTS

| | | | | |
|---|---|---|---|---|
| 4,563,559 A * | 1/1986 | Enami | ...................... | F24C 15/08 |
| | | | | 220/619 |
| 4,778,968 A * | 10/1988 | Torres | ...................... | H05B 6/64 |
| | | | | 126/39 M |
| 5,290,985 A * | 3/1994 | Jancic | ...................... | H05B 6/64 |
| | | | | 99/DIG. 14 |
| 5,893,997 A * | 4/1999 | Gustafsson | .......... | H05B 6/6414 |
| | | | | 219/762 |
| 7,232,979 B2 * | 6/2007 | Bray | ...................... | F24C 15/007 |
| | | | | 126/39 M |
| 7,355,153 B1 * | 4/2008 | Nuzzolillo | ........... | H05B 6/6426 |
| | | | | 219/754 |
| 2009/0152770 A1 * | 6/2009 | Mikac | ................. | B29C 45/4421 |
| | | | | 425/577 |

FOREIGN PATENT DOCUMENTS

| | | | | |
|---|---|---|---|---|
| EP | 1867458 A1 | 12/2007 | | |
| EP | 1547446 B1 * | 11/2008 | ............ | A47J 36/027 |
| GB | 2505870 B | 7/2015 | | |

OTHER PUBLICATIONS

International Search Report (Form PCT/ISA/210) and Written Opinion of the International Searching Authority (Form PCT/ISA/237) for International Application No. PCT/IB2019/054681 dated Aug. 20, 2019 (15 pages).

Unknown, "7 Tips for Choosing Great Gate Locations—Custom Tips for Injection Molding", Mar. 7, 2011, Retrieved from the Internet: <URL:http://injectionmolding.blog.quickparts.com/2011/03/07/7-tips-for-choosing-great-gate-locations/> [Retrieved on Aug. 6, 2019].

Autodesk.Help, "Gate Location analysis (Concept) | Moldflow Insight | Autodesk Knowledge Network", Oct. 7, 2014, Retrieved from the Internet: <URL:https://knowledge.autodesk.com/support/moldflow-insight/learn-explore/caas/CloudHelp/cloudhelp/2015/ENU/MoldflowInsight/files/GUID-A43C0B23-CE72-4C1E-9DE8-3FA39AFCCDDA-htm.html> [Retrieved on Aug. 6, 2019].

* cited by examiner

INJECTION MOULDING METHOD AND SYSTEM FOR FORMING AN OVEN LINER AS WELL AS OVEN LINER

CROSS-REFERENCE TO RELATED APPLICATIONS

This application is a 35 U.S.C. § 371 national phase filing of International Application No. PCT/IB2019/054681 filed on Jun. 5, 2019, and claims the benefit of United Kingdom Patent Application No. 1815555.6 filed on Sep. 24, 2018 and of United Kingdom Patent Application No. 1809231.2 filed on Jun. 5, 2018, wherein the disclosures of the foregoing applications are hereby incorporated by reference herein in their respective entireties.

FIELD

The present invention relates to an injection moulding method and system for forming an oven liner, particularly of the type that is used with microwave ovens.

BACKGROUND

Oven liners are of particular benefit when used inside microwave ovens. They improve hygiene, as where food spills or spurts, this occurs on the oven liner rather than on interior surfaces of the microwave oven.

Oven liners were typically formed from polypropylene or polycarbonate materials. However, these materials suffered from a number of disadvantages, including: ageing due to repeated microwave exposure; crazing caused by repeated washings; and stress fractures which formed due to uneven cooling, sometimes caused as a result of inconsistent material thicknesses.

Where hot feed injection moulding processes are deployed, material feeds are injected at a rate of around 300-400 grams/second (g/s). These rates require higher temperatures in order to maintain the material in a suitably viscous state to be able to flow into all zones of a mould cavity. However, a problem experienced with polycarbonates is that they can rapidly deteriorate when handled outside a relatively narrow range of total material flow length to average wall thickness of a moulded item. This range is known as the aspect ratio and increases for larger, polycarbonate mouldings which are typically fabricated at high temperatures, around 200° C. to 250° C.

It is apparent therefore that when fabricating oven liners, several challenges had to be overcome. It is important that a food safe material is used. Such materials must not fracture or give rise to shards, which risked contaminating food or beverages being warmed. Another strict requirement is that the material from which the oven liner is formed is and able to withstand repeated exposure to microwave radiations. Polycarbonate materials also have a tendency to become scuffed due to repeated washings and therefore lost their aesthetic appearance.

However, a problem that was occasionally encountered during the manufacturing process was that an incongruent mould surface profile was formed. This was caused by minor variations in the cooling and inconsistencies in material formation which tended to occur more frequently in larger pieces, such as oven liners. These variations within a wall arose due to thickening or solidification of resin prior to full cavity fill. These imperfections, also known as cold flow lines, resulted in rejection of finished pieces.

As with many processes a number of, often conflicting technical difficulties, have to be overcome in injection moulding processes. A first is the need to inject feed material at a sufficiently high temperature so that it flows and reaches all parts of the moulds so as to avoid voids or cavities forming.

Another difficulty is the need to inject material at a consistent temperature and pressure in order to ensure homogeneity of material properties and avoid stresses which gave rise to cause blushing.

A constant challenge with injection moulding systems is the requirement to maintain a consistent temperature across all parts of the mould tool. This is very important as incongruous cooling gives rise to thermal stresses which results in a wavy profile as a consequence of inconsistent cooling.

When moulding certain types of materials there is a need to control temperature and injection pressure (mass flow rates) because it is important that as material is injected into a volume defining a mould, it does not have to absorb energy from the mould in order to maintain its properties (such as density and viscosity), as otherwise there is a risk that the injected material hardens prematurely resulting in deformations. The risk is the mould tool absorbs heat from the molten material causing the material to prematurely harden. This is avoided by carefully controlling the temperature of the mould tool. Heating systems, which usually include water temperature stabilisation systems, were provided in order to mitigate this.

Another problem encountered in larger size injection mouldings is that there was often a pressure drop that was encountered as a consequence of the need to deliver rapidly large volumes of feed material.

Polymer manufacturers have developed a number of polymers which overcome all the aforementioned problems as well as satisfying stringent food safety regulations, brittleness resistance, desired flow characteristics and tolerance to high temperatures.

Other well-known design constraints that are encountered when moulding larger items, especially where these are relatively thin or have high aspect ratios, is that delivery bores for the molten feed material need to be dimensioned so as to be of sufficiently large bore in order to permit relatively large volumes of material, typically in excess of 200 cm$^3$/s.

A trade off is therefore often made in order to optimise pressure feed, rate of delivery of feed material and its properties as described above.

Some thermoplastic polymers, for example those polymers in the groups of poly-methyl-pentenes, are well suited to overcome most of the aforementioned problems. However, they are not ideally suited for larger items because of their flow properties and tendency to warp when used in large items, typically items whose aspect ratio is in excess of 10.

PRIOR ART

An example of a microwave oven liner is described in European Patent EP-A-1547446 (Cavity Prot Systems Ltd). The microwave oven liner is an injection moulding having a roof, a floor, a back and two sides. The oven liner is formed from polypropylene and is sized to be a sliding fit in a microwave oven. The oven liner has a sloping roof that is shorter at the front to allow air circulation.

Another example of an oven liner is described in UK Patent GB-B-2 505 870 (Regale Microwave Ovens ltd).

The invention arose in order to overcome the aforementioned problems.

SUMMARY OF THE INVENTION

According to a first aspect of the invention there is provided an injection moulding system for forming an oven liner with a split line on at least one side of an interior surface thereof, the system comprising: a first mould tool defining a cavity, with length (L), width (W) and height (H) and a wedge collapsing tool; the first mould tool has a substantially rectangular end face with dimensions corresponding to width (W) and height (H) of the cavity and has a hot feed located at a centroid of its end face; the wedge collapsing tool is received in the cavity so as to contact and engage with an external periphery of the first mould tool at selected locations in order to define a volume into which hot material feed is injected, characterised in that the wedge collapsing tool comprises at least a first and a second part, whereby the first and second parts are in slidable contact one with another and the width ($W_1$) of the first part of the wedge collapsing tool is at least 0.1 mm less than and the width ($W_2$) of the second part of the wedge collapsing tool.

The split line is preferably defined between portions of the oven liner of different thickness and/or between which define portions of a cavity thereof with different widths.

In use, the volume is preferably defined between the wedge collapsing tool and the inside walls of the cavity defined by the first mould tool. The volume preferably comprises a first portion between the first part of the wedge collapsing tool and a second portion between the second part of the wedge collapsing tool, the first portion being wider than the second portion due to the difference in the widths ($W_1$ and $W_2$) of the first and second parts of the wedge collapsing tool. The first and second portions are preferably defined between the side of the interior of the cavity of the first mould tool and the sides of the first and second parts of the wedge collapsing tool. The width (W) of the cavity of the first mould tool is preferably substantially or entirely constant.

Hot material feed is then injected into the volume (preferably via the hot feed at the centroid of the end face) so as to preferably fill the volume and cool and set to form the oven liner. The oven liner preferably comprises a first portion and a second portion (preferably of one or more of its side walls) of different widths and/or thicknesses, as a consequence of the difference in widths of the first and second portions of the wedge collapsing tool. The split line is preferably defined between the first and second portions of the oven liner.

The fact that the system includes a wedge collapsing tool, together with the other features of the system, ensure that there is surety of release of the mould tool from the oven liner thereby ensuring there is no sticking or inadvertent entrapment of the oven liner with any part of the wedge collapsing tool.

The two-part wedge collapsing tool is preferably in the form of a structure or block of material with two parts with different widths which are separable, the two parts being at least generally wedge shaped. For example, the wedge collapsing tool may be a substantially cuboid or parallelepiped structure or block comprising first and second separable parts which are cuboids with five substantially orthogonal faces and one sloped face such that the parts define a wedge shape, the angles of the sloped surface of each part with respect to the orthogonal faces of that part being preferably substantially equal such that the two parts are arrangeable or can be configured with their sloped faces in contact with each other and such that together the parts define the substantially cuboid structure or block.

The two parts of the wedge collapsing tool have different widths, the widths preferably being between external sides of the wedge collapsing tool when the two parts are arranged in slideable contact and/or preferably being in direction of width of cavity in use.

The wedge shapes of the parts of the wedge collapsing tool advantageously facilitate the removal of the wedge collapsing tool from the cavity after the oven liner has been formed, with a wedge-shaped part with a thicker end being located towards the opening of the cavity (through which the wedge collapsing tool is inserted into the cavity) being removed first, and the wedge shaped part with a thinner end located towards the opening being removed after the wedge shaped part with the ticker end towards the opening. The first narrower part of the wedge collapsing tool preferably being the part removed second. The first narrower part of the wedge collapsing tool and/or the part of the wedge collapsing tool which is removed second is preferably the lower part of the wedge collapsing tool in use.

According to a second aspect of the invention there is provided a method of injection moulding an oven liner with a split line on at least one interior surface thereof defining two portions of different widths thereof, the method including the steps of: injecting under pressure a feed material into a first mould tool that defines a cavity, with length (L), width (W) and height (H), the first mould tool has a substantially rectangular end face with dimensions corresponding to width (W) and height (H) of the cavity and has a hot feed located at a centroid of its end face; operating a wedge collapsing tool so that it is received in the cavity; contacting and engaging with an external periphery of the first mould tool at selected locations in order to define a volume into which hot material feed is injected; removing a first part of a wedge collapsing tool and subsequently removing a second part of a wedge collapsing tool part, whereby the first and second parts are in slidable contact one with another, the width ($W_1$) of the first part of the wedge collapsing tool is at least 0.1 mm less than and the width ($W_2$) of the second part of the wedge collapsing tool.

The dimensions of the oven liner correspond to a microwave oven whose depth corresponds to the aforementioned length (L) and whose width (W), when facing the oven corresponds to the width (W) of the oven liner and whose height corresponds to the height (H) of the oven liner.

Ideally the width (W) is at least 0.25 m, the height (H) is at least 0.1 m and/or the length (L) is at least 0.3 m.

Preferably the wall thickness of the liner is less than 10 mm; preferably the wall thickness of the liner is less than 8 mm.

The split is ideally formed symmetrically on opposite sides of the interior surface of the oven liner. However, asymmetric formation of the split lines may be formed on opposite side faces depending upon the shape of the collapsing tools.

Vents are provided in the mould tools in order to aid the release of air, at a desired pressure and at a sufficiently low mass flow rate, in order to avoid combustion. An optimum trade-off between injection rate of material and rate of evacuation of high volumes of air has assisted in reliable moulding of the oven liners at rapid rates and without deformation or burning of material due to explosive combustion of vented air.

There may be in excess of 10, preferably more than 20 or ideally more than 30 vents in each mould tool in order to achieve this.

The system may include a consent switch which controls the instant removal of each mould tool so that a finished item is released from the moulding system.

As the difference between ($W_1$) and ($W_2$) is less than 1 mm, preferably the difference between ($W_1$) and ($W_2$) is less than 0.5 mm, preferably less than 0.25 mm.

The feed material includes a poly-methyl-pentene polymer, such as Matsui TPX 18®.

The delivery system ideally has a pressure feed that injects feed material at a flow rate in excess of 200 g/cm$^3$, preferably in excess of 300 g/cm$^3$ and most preferably in excess of 400 g/cm$^3$.

A pressure feed may inject feed material at a temperature in excess of 250° C. and preferably in excess of 300° C. The feed material is injected at a temperature of between 250° C. and 350° C., preferably between at a temperature 275° C. and 325° C.

The ideal pressure of feed material injection is between 80 to 110 Bar, ideally between 90 and 100 Bar (between 8 MPa, to 11 MPa, ideally between 9 MPa and 10 MPa).

A heating system includes a series of hot water jackets. Alternatively, where greater temperatures are required over larger tool surfaces, oil heated jackets may be employed as these are capable of operating at temperatures in excess of 350° C. The system may include an oil heating system.

There is therefore provided an oven liner that is formed from an injection moulding system, the oven liner has a split line formed on its surface that defines an interface between an upper and a lower portion thereof. The split line is ideally symmetrically formed along opposite lateral faces of the oven liner and delineates two regions of differing wall thickness in the moulded oven liner. This enables differential release of first collapsing mould tool part before a second collapsing mould tool part, so that this preferred sequence ensures the oven liner remains temporarily held by the second collapsing mould tool part after the first mould part has been removed from its cavity.

Preferred embodiments of the invention will now be described with reference to the Figures in which:

DETAILED DESCRIPTION OF PREFERRED EMBODIMENT OF THE INVENTION

Figure 1A:
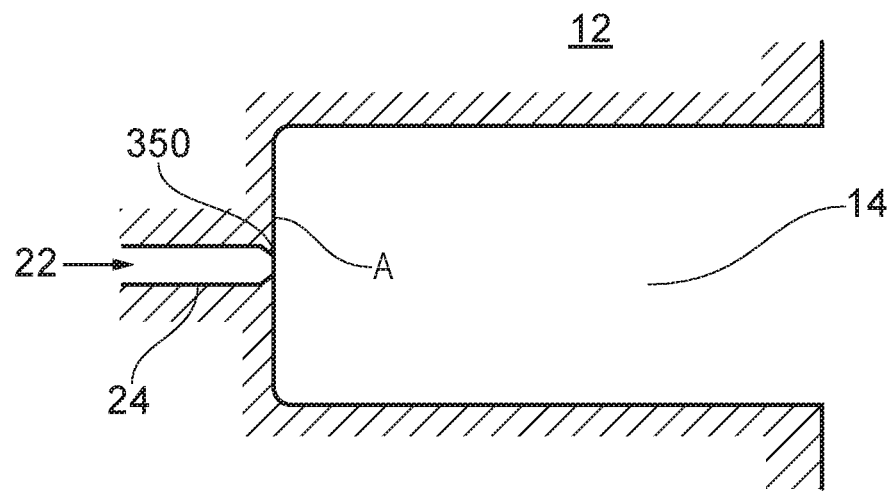
FIG. 1a shows a simplified, diagrammatical sectional view of a first mould tool.

Referring to the Figures generally there is shown an example of an injection moulding system for forming an oven liner 20. The system includes a first mould tool 12 that defines a cavity 14 of length (L), width (W) and height (H). The first mould tool 12 (and the cavity 14 thereof) has a substantially rectangular end face (A), shown diagrammatically in FIG. 7.

The dimensions of the end face (A) correspond to width (W) and height (H) of the cavity 14. A hot feed 22 is located at a centroid of the end face A and is also shown in greater detail in FIG. 5. The hot feed 22 allows hot liquid material for setting to form the mould tool to be injected into the cavity 14, and into a volume (V) defined therein for forming the oven liner 20.

The injection moulding system further comprises a two-part wedge collapsing tool 30 which comprises a first part 32 and a second part 34. The first and second parts 32, 34 are each substantially in the shape of cuboids with five orthogonal faces and a single sloped face at an angle to the remaining faces.

The angles of the sloped faces of each of the two parts 32, 34 with respect to the remaining faces of that part are substantially equal. As such, the two parts 32, 34 are arrangeable with their sloped faces in contact with each other such that they define a generally regular cuboid shaped block or structure.

In use, the two-part wedge collapsing tool 30 is received in the cavity 14 such that it contacts and engages with an external periphery of the first mould tool 12 at selected locations in order to define a volume (V) between its exterior and the interior surface of the cavity 14, into which hot material feed (indicated by arrows) is injected in use. The feed material cools in the volume (V) in order to form the oven liner 20.

Figure 1B:
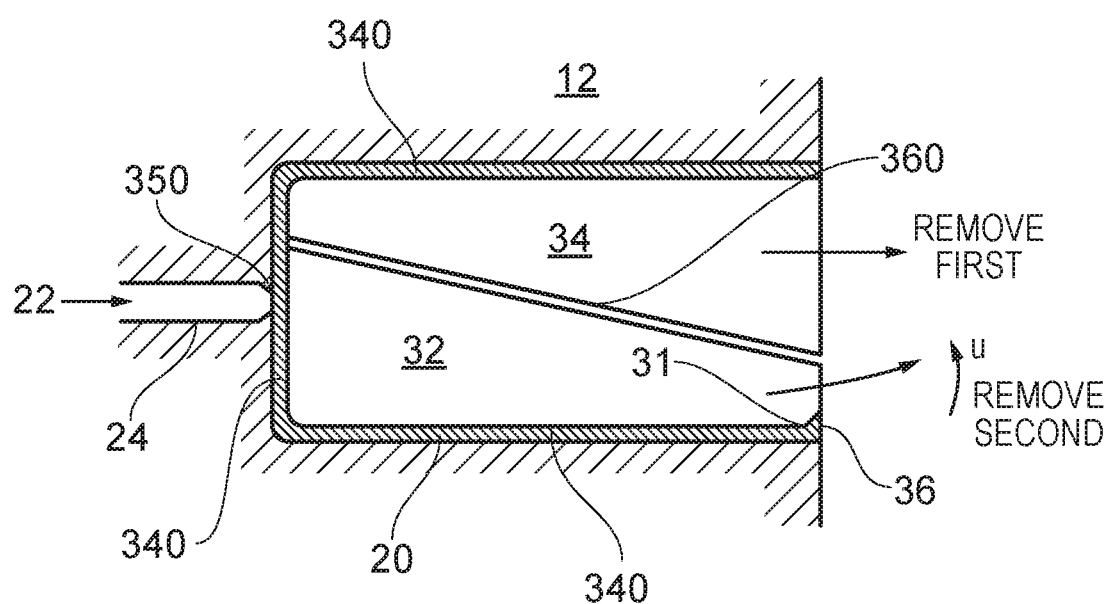
FIG. 1b shows a simplified diagrammatical view of the first mould tool receiving a wedge collapsing tool and defining a mould for an oven liner.
Figure 2:
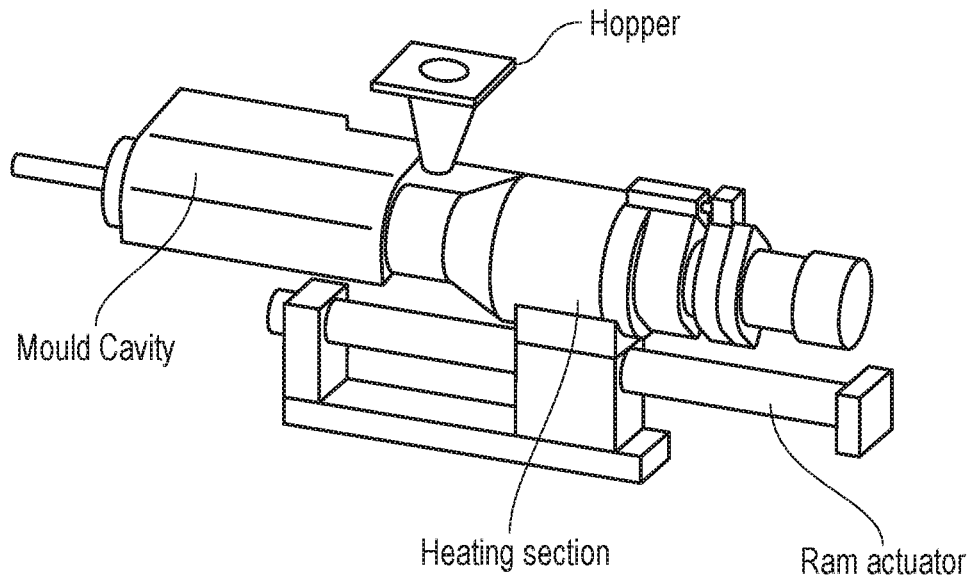
FIG. 2 is an overall view of one embodiment of an injection moulding system.
Figure 3:
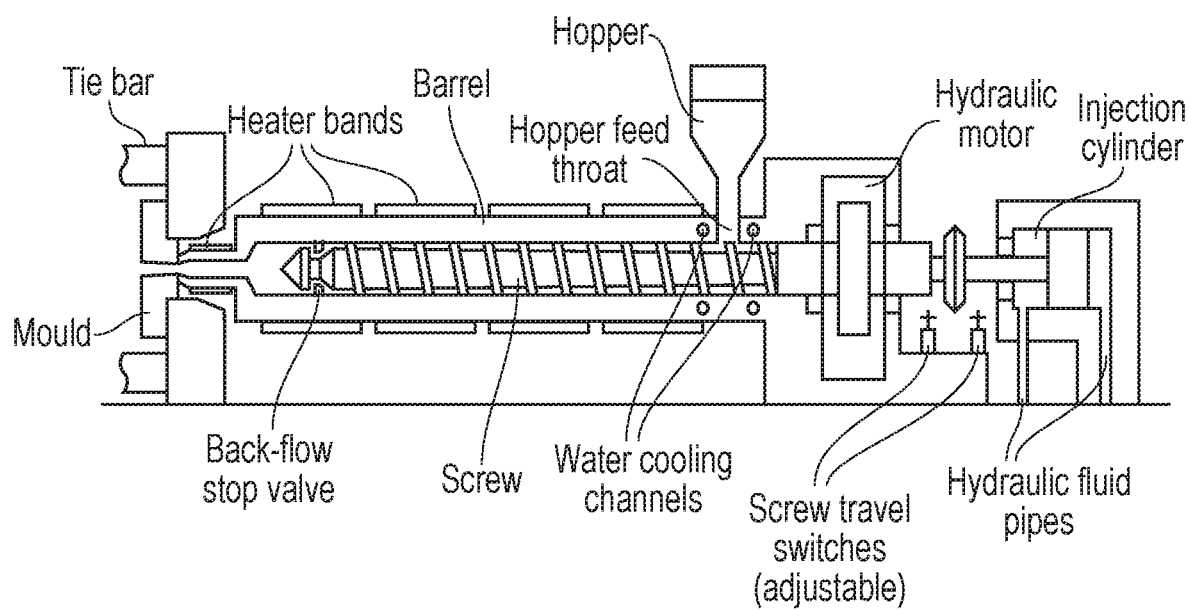
FIG. 3 is a cross-sectional diagrammatic view of the injection moulding system of FIG. 2.

FIG. 1A shows the cavity 12 with the two-part collapsing wedge tool 30 absent and FIG. 1B shows the cavity 12 with the two-part collapsing wedge tool 30 inserted so as to define the volume within which the oven line 20 is formed.

The width ($W_1$) of the first part 32 of the wedge collapsing tool 30 is at least 0.1 mm less than and the width ($W_2$) of the second part 34 of the wedge collapsing tool. As such, the combined thicknesses of the portions of the volume V between the first part 32 and the side faces of the cavity 14 (with length L and height H) on either side thereof are at least 0.1 mm greater than the combined thickness of the volume V between the second part 34 and the side faces of the cavity 14 on either side thereof. As such the oven liner 20 will be formed with a split line 33 formed on at least one side of an interior surface of the oven liner 20 between portions of different thickness along the separation 360 between the two parts 32, 34.

The two parts 32 and 34 are each wedge-shaped cuboids with five orthogonal faces and a single sloped face. They each taper from relatively deep first ends to relatively shallow second ends. The two parts 32, 34 being shaped to fit together so as to define a generally rectangular cuboid shaped body which is slightly smaller than the interior of the cavity 14 so as to define the volume V for the oven liner intermediate the two parts 32, 34 and the inside faces of the mould tool 12. The contacting sloped surfaces where the two wedges are separated are given by reference numeral 360.

In the illustrated embodiment, the two parts 32, 34 of the wedge collapsing tool 30 have substantially equal lengths and substantially equal heights at their deep ends and at each point along their lengths with the exception of to their shallow ends.

The first part 32 comprises a chamfered or rounded edge 31 at its second shallow end opposite from its sloped surface so as to define a wider portion of the volume V distal from the end face A in use, this wider portion of the volume V allows a wider portion of the oven liner 20 to be formed so as to define a lip 36 of the oven liner 20.

In use the first mould tool part 32 is inserted into the cavity 14 first with its deeper end against the end face A of the cavity 14 and its shallower end at the opening of the cavity 14 with its chamfered or rounded edge 31 against the edge of the cavity. The second mould tool part 34 is then inserted with its shallower end against the end face A of the cavity. The two sloped surfaces of the first and second parts 32, 34 being in slideable contact with each other.

In use, hot feed material is then injected into the volume (V) to fill it through the hot feed and then sets to form the oven liner 20. The shape of the oven liner 20 being defined by the that of the volume V between the interior surfaces of the cavity 14 and the wedge collapsing tool 30. After the oven liner 20 has been formed, the wedge collapsing tool 30 is removed part by part.

When the wedge collapsing tool parts 32, 34 are removed after an oven liner 20 has been formed, the second part 34 is removed first, thereby allowing the first part 32 to be removed afterwards and to be lifted up over the lip 36 of the oven liner formed against its rounded or chamfered edge 31. These steps are indicated by arrows in FIG. 1B.

Figure 10:
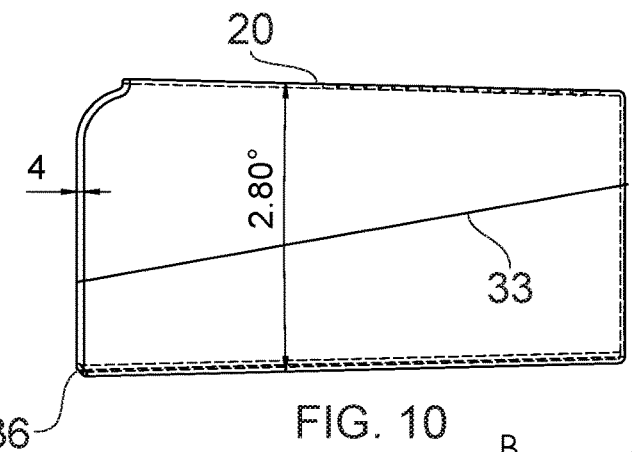
FIGS. 10 to 14 show different views of a preferred embodiment of the oven liner formed using the system.
Figure 11:
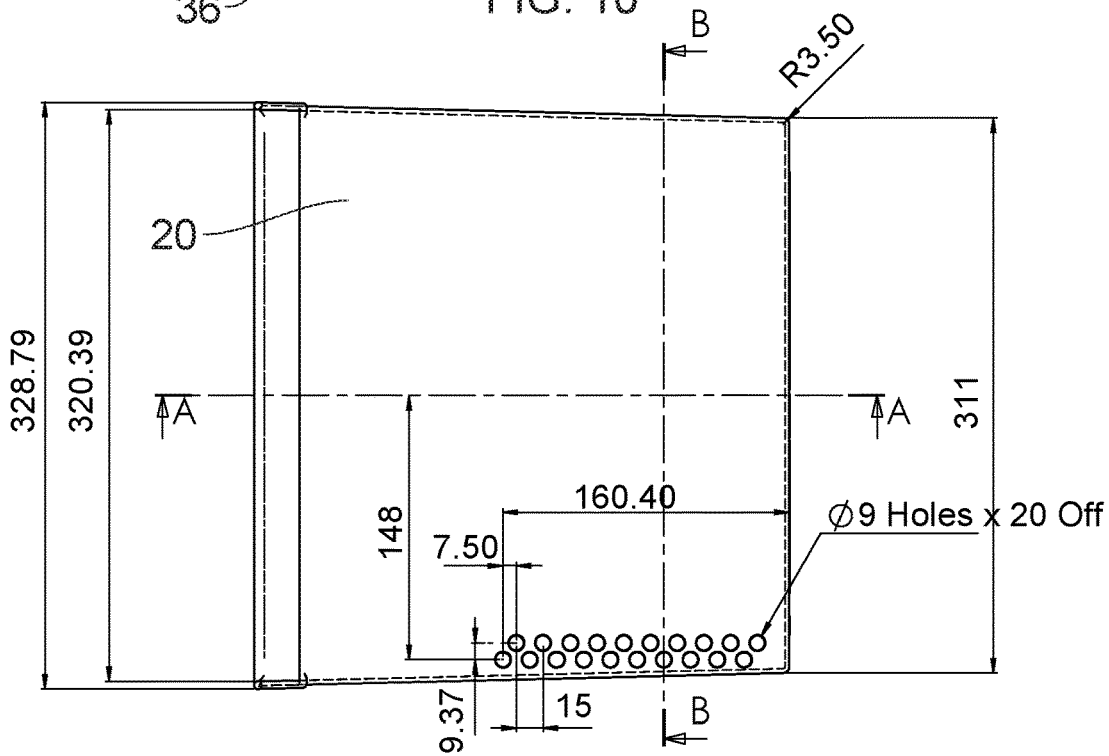
Figure 12:
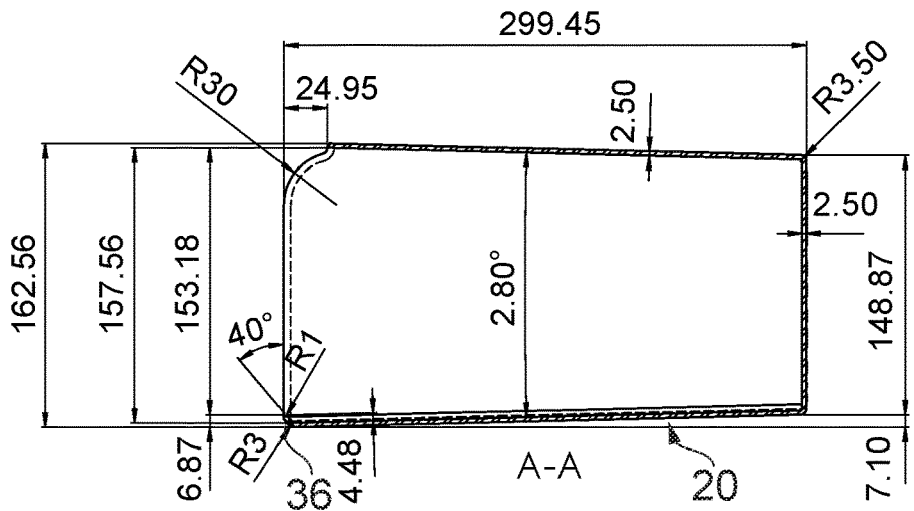
Figure 13:
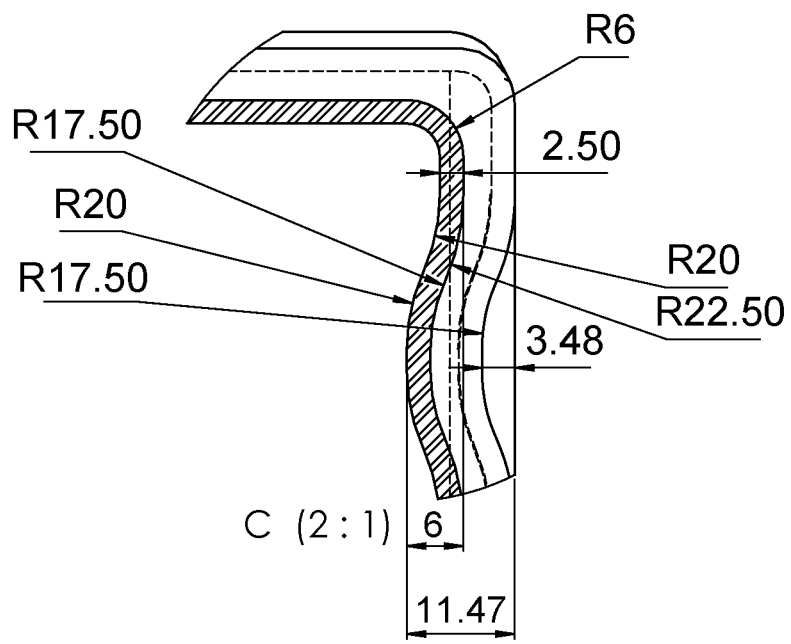
Figure 14:
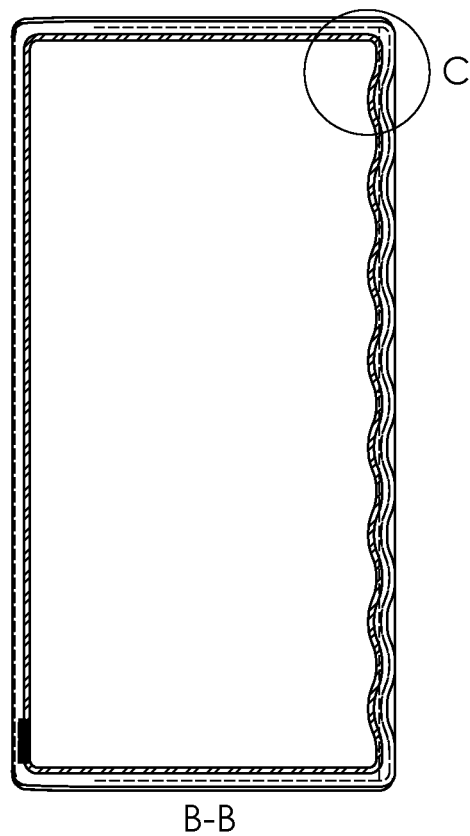

The two-part wedge collapsing tool 30 shown in FIG. 1B is generally cuboid in shaped when the two parts 32, 34 are arranged together. In other embodiments the wedge collapsing tool 30 with the two parts 32, 34 combined may be slightly tapered for use with a slightly tapered mould tool 12 (for example, so as to produce slightly tapered oven liners 20 as shown in FIGS. 10 to 12).

In the illustrated embodiments the two parts 32, 34 of the wedge collapsing tools 30 are of generally equal sizes, in alternative variant embodiments one of the wedges 32, 34 may be substantially larger than the other and may fill substantially more of the cavity 14 than the other.

A particularly effective material for injecting into the volume and for forming an oven liner is sold under the brand name TPX RT18® which is supplied by Mitsui Chemicals Inc. TPX RT18 was supplied primarily for injection moulding relatively small items, such as parts for coffee makers cosmetic containers, baking cartons, coatings for wires and cables, specialist high temperature films, medical devices, blood cell test kits and sight glasses.

The material is a thermoplastic polymer and belongs to the groups of polymethylpentenes (PMP) and is suitable for both injection and extrusion moulding. It has a low water absorption coefficient (0.01%) and a density of around 833 kg/m$^3$.

Other types of methyl pentenes or blends of different methyl pentene families may also be used to form the oven liner.

An advantage with these types of thermoplastic polymers is that they are clear and not prone to crazing or hazing when moulded and may be used to form a clear, transparent oven liner 20. These types of thermoplastic polymers are also resistant to microwave radiation. Therefore, use of the invention enables polymers, such as poly-methyl-pentenes, which have good flow melt rates and optical properties, to be used to fabricate larger injection moulded items which was previously not recommended.

The melt flow index of the material is ideally in excess of 7, preferably in excess of 8. This is important because feed material should not spend too long in the delivery chamber 24 or in delivery lines 14.

So-called shear heating may be employed in order to maintain good flow characteristics whilst remaining below material clouding temperatures.

Figure 5:
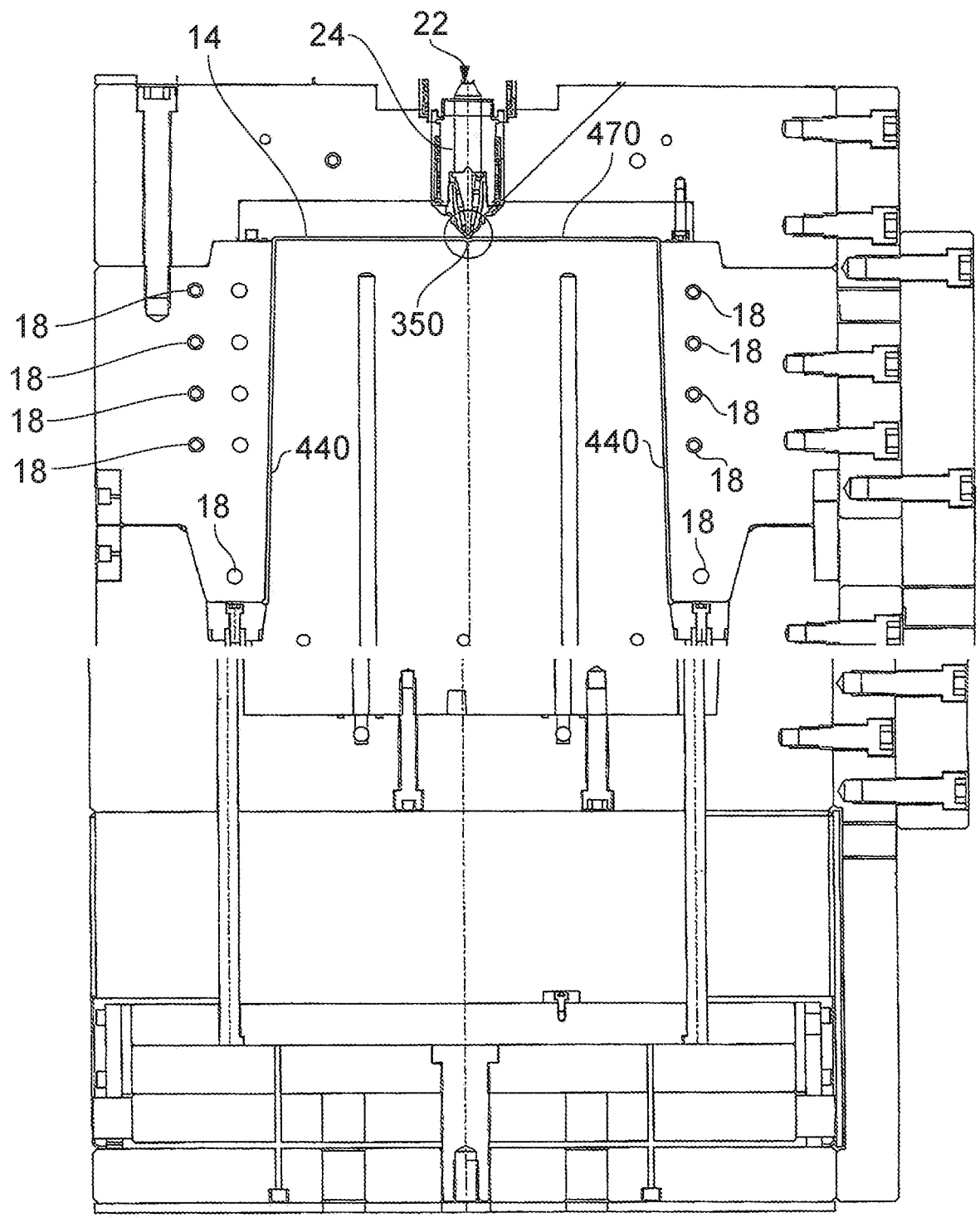
FIG. 5 is a detailed lengthwise sectional view, through the hot feed channel, of a preferred embodiment of the first mould tool receiving the wedge collapsing mould tool.

FIG. 1B shows injection lines 340 leading from input port 350 where the feed 22 opens into the cavity 14 at the centroid of the end face A, the injections lines being through the volume V. FIG. 5 also shows injection lines 440 leading from the input port 350.

A consent switch (not shown) controls the instant of injection of material into the cavity and volume thereof, and the release of the finished oven liner 20 from the moulding system. An advantage of this is it ensures the mould is correctly closed and so ensures that no damage to the tool takes place.

Figure 4:
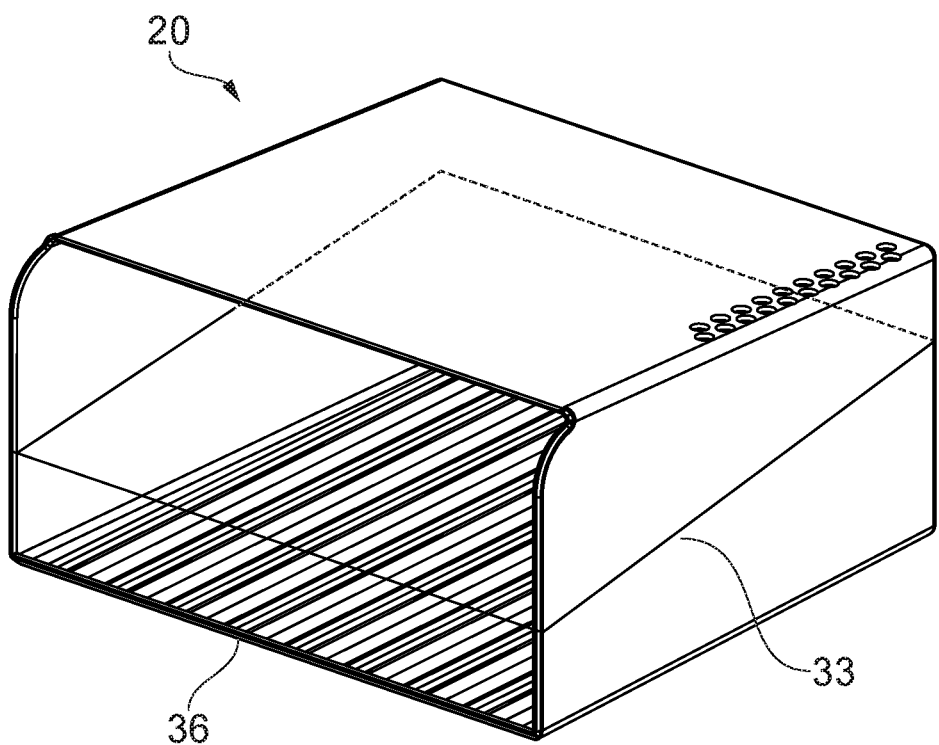
FIG. 4 is a simplified overall view of one example of an oven liner formed using the system with split lines emphasized.

FIG. 4 is an overall isometric view of an oven liner 20 produced using the system showing the lip 36 and a split line 33 where the adjacent the meeting sloped edges 360 of the two-part wedge collapsing tool 30 separate different width portions of the wedge collapsing tool 30 and the volume V defined thereby.

Figure 6:
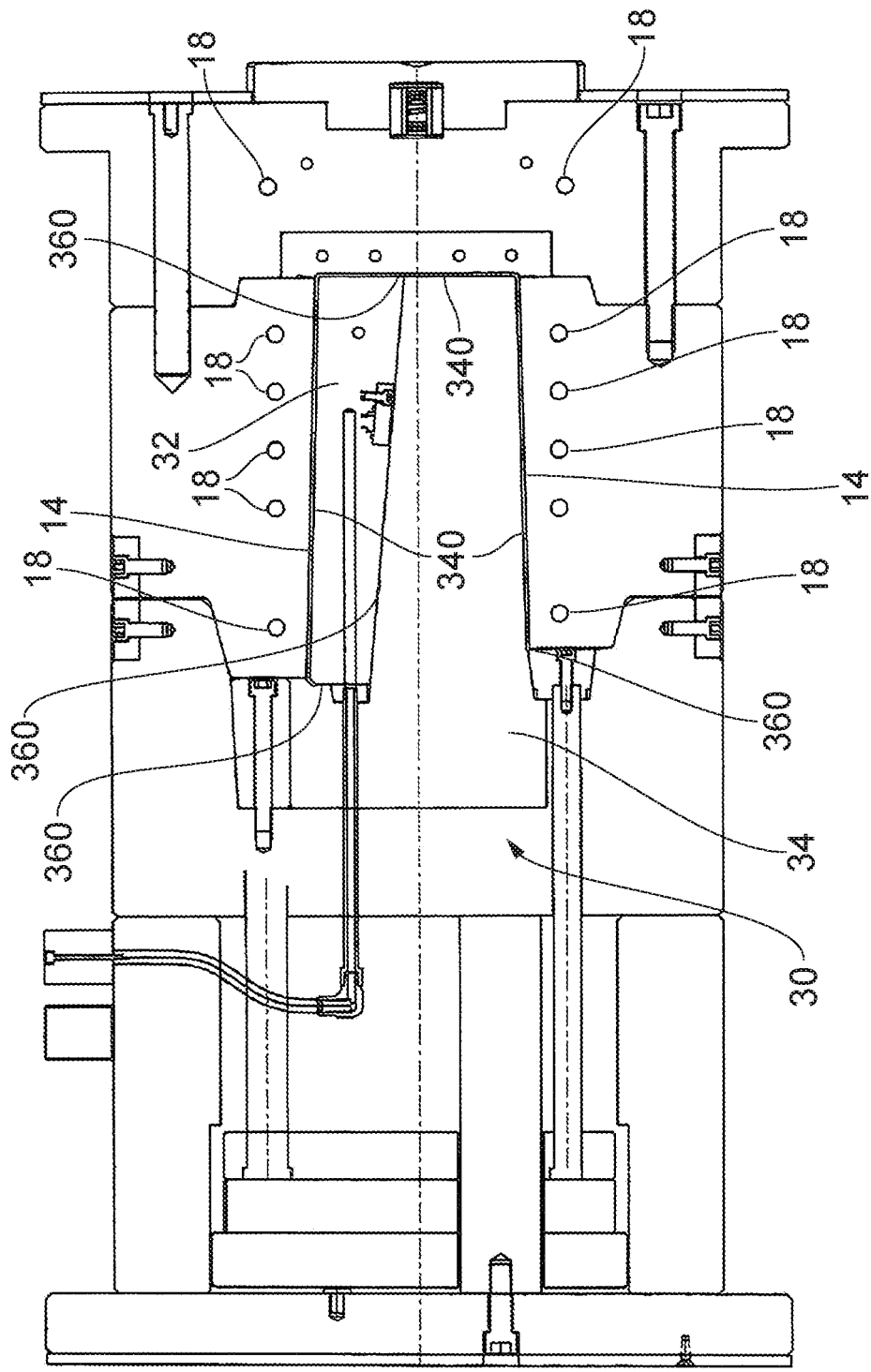
FIG. 6 is a detailed sectional view of the first mould tool receiving the wedge collapsing mould tool shown in FIG. 5 and shows hydraulic channels for displacing the mould tool parts in order to release a moulding from a mould cavity.

FIG. 5 is a simplified overall view of one example of an oven liner and shows split lines emphasized. FIG. 6 is a detailed lengthwise sectional view, through the hot feed channel, of a preferred embodiment of the wedge collapsing mould tool.

Figure 7:
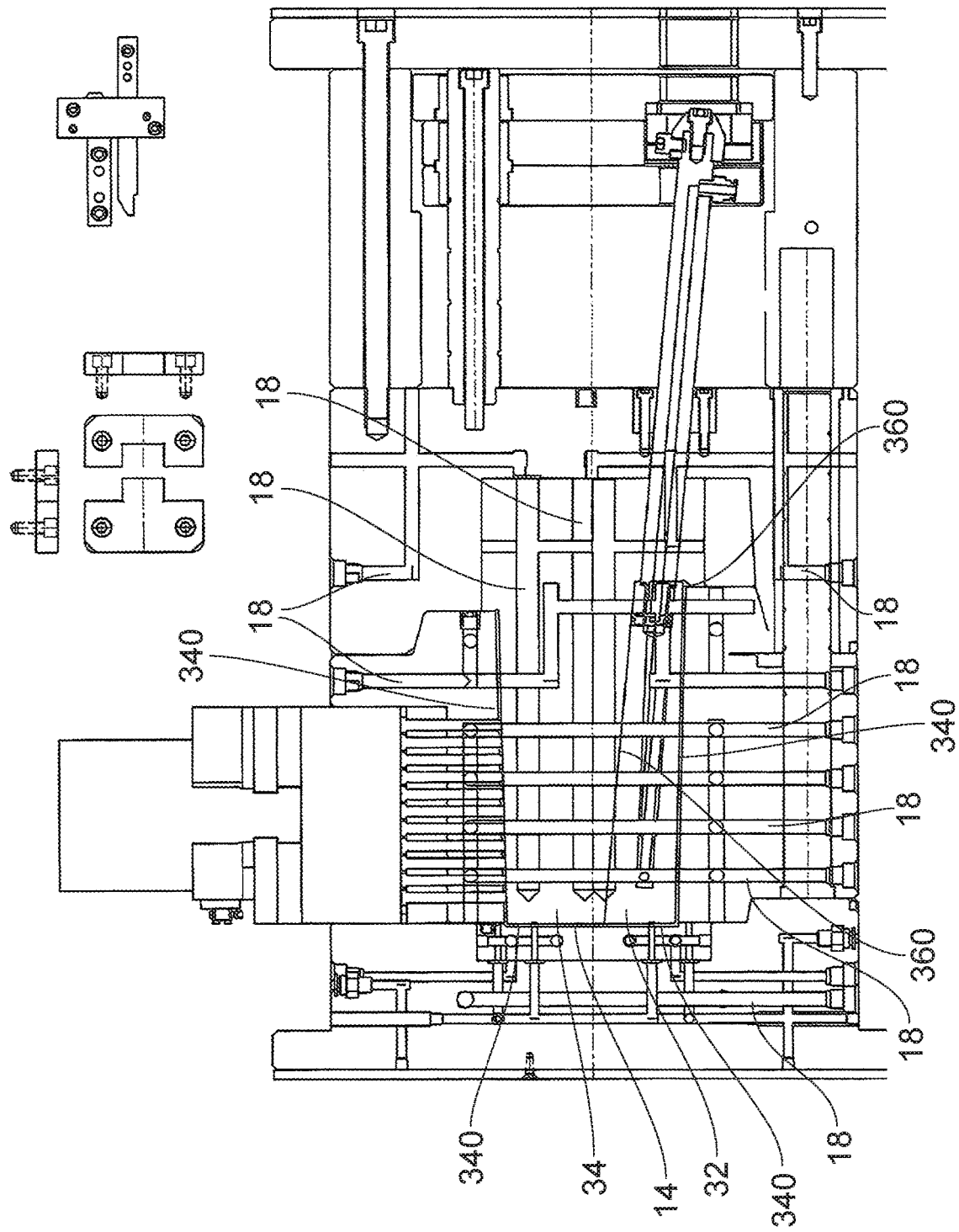
FIG. 7 is a detailed sectional view of the first mould tool receiving the wedge collapsing mould tool shown in FIG. 5 and shows water cooling channels for cooling the mould tool parts in order that a homogeneous workpiece is formed in the mould cavity.

FIG. 7 is a detailed sectional view of the wedge collapsing mould tool and oven liner shown in FIG. 6 and shows hydraulic channels for displacing the mould tool parts in order to release a moulding from a mould cavity.

Figure 8:
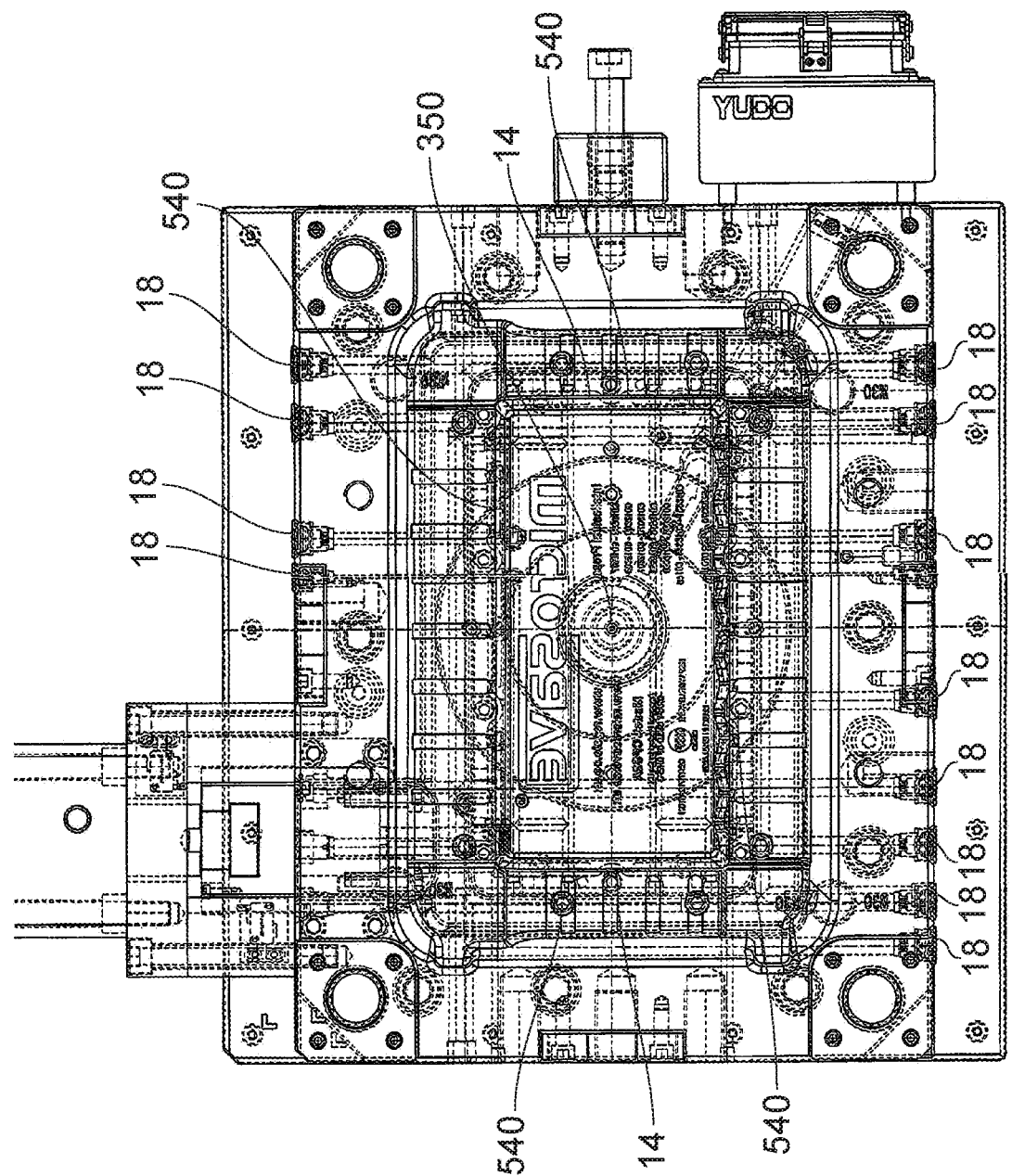
FIG. 8 is a plan view, showing hidden detail, of a rear inward facing surface of the first mould tool that defines the cavity, and shows reversed lettering for embossing the outer surface of the oven liner.

FIG. 8 is a detailed sectional view of the wedge collapsing mould tool shown in FIG. 6 and shows water cooling channels for cooling the mould tool parts in order that a homogeneous workpiece is formed in the mould cavity.

Figure 9:
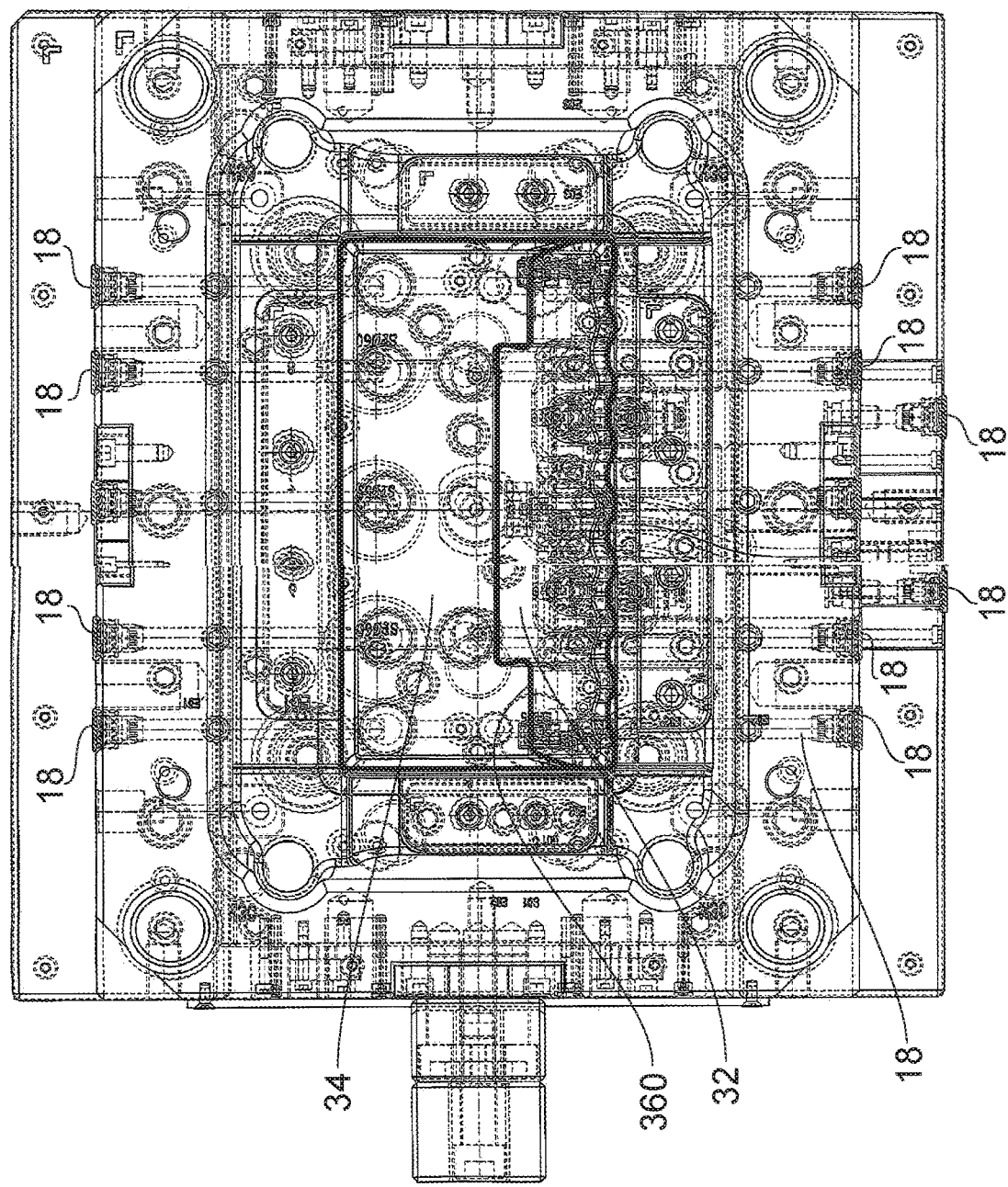
FIG. 9 is a plan view, showing hidden detail, of a inward facing surface of the first mould tool.

FIG. 9 is a plan view, showing hidden detail, of a rear inward facing surface of the first mould tool.

FIG. 10 shows a side profile view of an oven liner 20 produced using the system. FIGS. 11 and 12 show profile and top down views of the oven liner 20.

The method of injection moulding the oven liner includes the steps of: injecting under pressure a feed material into a first mould tool that defines a cavity, whose length is (L), whose width (W) and whose height is (H). The first mould tool has a substantially rectangular end face with dimensions corresponding to width (W) and height (H) of the cavity and has a hot feed via which the feed material is injected located at a centroid of its end face.

By arranging a wedge collapsing tool 30 within the cavity, contacting and engaging with an external periphery of the first mould tool at selected locations, a volume is defined into which hot material feed is injected. The volume being defined between the inside walls of the cavity and the exterior of the wedge collapsing tool. After the oven liner has been formed within the volume, the first part 32 of a wedge collapsing tool 30 is removed and subsequently the second part 34 of a wedge collapsing tool 30 is removed. When the first and second parts 32, 34 are arranged together within the cavity 14, they are in slidable contact one with another. The width ($W_1$) of the first part of the wedge collapsing tool is at least 0.1 mm less than and the width ($W_2$) of the second part of the wedge collapsing tool. As such, when the two parts 32, 34 are arranged within a cavity 14 (preferably of constant width) the portions of the volume defined between the sides of the two parts and the mould tool 12 are of different thicknesses. As such, a split line 33 is formed on at least one side of an interior surface of the oven liner, between portions of different thickness thereof.

The floor of the oven liner 20 is formed with a lip 36 along a lower front edge to catch any spilled liquids in the oven. The lip 36 being formed by a chamfered edge of the lower mould tool 32 which is arranged at the base of its deeper end distal from the end face A of the cavity 14 in use. The lower part of the mould tool therefore cannot be removed in along an axis from the cavity; instead lower mould tool 32 is tilted (in direction of an upwards arrow U in FIG. 1) and raised up slightly at an angle in order to be withdrawn over the top of lip 36 before it is extracted from within the oven liner cavity. The lip may be rigid.

The upper mould tool part 34 is slightly wider than the bottom mould tool part 32, and as such defines an upper wider portion of the oven liner 20. The upper mould tool part 34 is removed first from the cavity defined by the mould tool 12 and from the interior of the oven liner 20 formed therein, the lower mould tool part 32 may then be lifted into the wider upper portion of the interior of the oven liner 20 and lifted over the lip 36 to be removed from the oven liner.

After the moulded oven liner 20 is formed, it starts to cool and contract. The second mould tool part 34 can then be released because it can be lifted and withdrawn without scuffing or deforming the slightly wider side walls of the still hot and soft moulded oven liner 20. The oven liner 20 can then be removed from the mould tool 12 without distortion or scuffing.

This is why the oven liner 20 is designed to have a differential width internal cavity manifested by a score line 33 or split line running between portions of differently thick walls and/or which define differently wide portions of the interior of the oven liner. The split line 33 being defined along a separation interface 360 between the upper and lower portions of the two part wedge collapsing tool 30.

If the oven liner was designed to have a single width cavity with smooth walls then the lower tool would be squeezed by the cooling contracting upper side walls causing scuffing and distortion.

It is appreciated that in an alternative method the upper mould tool part 34 may be removed before the lower mould tool part 32, in which case the tapering portions are reversed and the split line 33 runs downwards from a rearward portion of the oven liner 20.

The invention has been described by way of example only and variation made to the embodiment described without departing from the scope of the invention as defined in the claims.

For example, although reference to the formation of the split lines being formed on at least one side of an interior surface of the oven liner, it is understood that split lines may be formed on one or more external surfaces of the oven liner, so as to employ the interior surfaces of a mould tool in order to grab different portions of the oven liner thereby aiding removal of the split mould tools.

LIST OF REFERENCE NUMERALS 12 first mould tool
14 cavity
18 water cooling channels
20 oven liner
22 hot feed
24 delivery chamber
30 two part wedge collapsing tool
31 chamfered or rounded edge
32 first mould tool part
33 split line
34 second mould tool part
36 rigid lip
340 material feed injection lines
350 input port
360 split lines
440 material feed injection lines
540 material feed injection lines

The invention claimed is:

1. An injection moulding system for forming an oven liner with a split line on at least one side of an interior surface of the oven liner, the injection moulding system comprising: a first mould tool defining a cavity with length (L), width (W) and height (H), and a wedge collapsing tool; the first mould tool has a substantially rectangular end face (A) with dimensions corresponding to the width (W) and height (H) of the cavity and has a hot feed located at a centroid of the substantially rectangular end face; the wedge collapsing tool is received in the cavity so as to contact and engage with an external periphery of the first mould tool at selected locations in order to define a volume (V) into which hot material feed is injected, wherein the wedge collapsing tool comprises a first part and a second part, whereby the first and second parts are in slidable contact one with another, and a width ($W_2$) of the second part of the wedge collapsing tool exceeds a width ($W_1$) of the first part of the wedge collapsing tool by at least 0.1 mm.

2. An injection moulding system according to claim 1 wherein the width (W) of the cavity is at least 0.25 m.

3. An injection moulding system according to claim 1 wherein the height (H) of the cavity is at least 0.1 m.

4. An injection moulding system according to claim 1 wherein the length (L) of the cavity is at least 0.3 m.

5. An injection moulding system according to claim 1 wherein a wall thickness of the liner is less than 10 mm.

6. An injection moulding system according to claim 1 wherein a wall thickness of the liner is less than 8 mm.

7. An injection moulding system according to claim 1 wherein the split line is formed on opposite sides of the interior surface of the oven liner.

8. An injection moulding system according to claim 1 includes a consent switch which controls the instant of removal of each mould tool so that a finished item is released from the moulding system.

9. An injection moulding system according to claim 1 wherein a difference between the width ($W_1$) of the first part of the wedge collapsing tool and the width ($W_2$) of the second part of the wedge collapsing tool is less than 1 mm.

10. An injection moulding system according to claim 1 wherein the difference between the width ($W_1$) of the first part of the wedge collapsing tool and the width ($W_2$) of the second part of the wedge collapsing tool is less than 0.5 mm.

11. An injection moulding system according to claim 1 wherein the feed material includes a poly-methyl-pentene polymer.

12. An injection moulding system according to claim 1 wherein a pressure feed injects polymer feed material at a flow rate in excess of 200 g/cm$^3$.

13. An injection moulding system according to claim 1 wherein a pressure feed injects polymer feed material at a flow rate in excess of 300 g/cm$^3$.

14. An injection moulding system according to claim 1 wherein a pressure feed injects feed material at a temperature in excess of 250° C.

15. An injection moulding system according to claim 1 wherein a pressure feed injects feed material at a pressure between 80 and 110 Bar.

16. An injection moulding system according to claim 1 wherein a pressure feed injects feed material at a pressure between 90 and 100 Bar.

17. An injection moulded oven liner formed from an injection moulding system according to claim 1 which has a split line formed on at least one interior surface of the oven liner, wherein the split line defines an interface between an upper and lower portion of the oven liner, the upper and lower portions having different widths.

18. The oven liner according to claim 17 formed from a polymer including poly-methyl-pentene.

19. A method of injection moulding an oven liner with a split line on at least one interior surface thereof defining two portions of a cavity of the oven liner with different widths, the method including the steps of injecting under pressure a feed material into a first mould tool that defines a cavity with a length (L), width (W) and height (H), the first mould tool has a substantially rectangular end face with dimensions corresponding to the width (W) and height (H) of the cavity and has a hot feed located at a centroid of the substantially rectangular end face; operating a wedge collapsing tool so that it is received in the cavity; contacting and engaging with an external periphery of the first mould tool at selected locations in order to define a volume into which hot material feed is injected; removing a first part of the wedge collapsing tool and subsequently removing a second part of the wedge collapsing tool part, whereby the first and second parts are in slidable contact one with another, and a width ($W_2$) of the second part of the wedge collapsing tool exceeds a width ($W_1$) of the first part of the wedge collapsing tool by at least 0.1 mm.

20. An injection moulded oven liner produced by the method of claim 19.

* * * * *